United States Patent
Lee

(10) Patent No.: US 7,382,779 B1
(45) Date of Patent: Jun. 3, 2008

(54) METHOD AND APPARATUS FOR CONFIGURING A NETWORK COMPONENT

(75) Inventor: Jin-Shi Lee, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 727 days.

(21) Appl. No.: 10/922,774

(22) Filed: Aug. 20, 2004

(51) Int. Cl.
*G06F 15/173* (2006.01)

(52) U.S. Cl. ...................... 370/392; 370/401
(58) Field of Classification Search ................ 370/401
See application file for complete search history.

(56) References Cited

U.S. PATENT DOCUMENTS

| | | | |
|---|---|---|---|
| 6,018,526 A * | 1/2000 | Liu et al. ............... | 370/401 |
| 6,393,487 B2 | 5/2002 | Boucher et al. | |
| 6,587,874 B1 | 7/2003 | Golla et al. | |
| 6,779,004 B1 | 8/2004 | Zintel | |
| 6,889,258 B1 * | 5/2005 | Liu et al. ............... | 709/245 |
| 6,892,230 B1 | 5/2005 | Gu et al. | |
| 7,143,435 B1 * | 11/2006 | Droms et al. ............ | 726/3 |
| 7,151,765 B2 * | 12/2006 | Zhang et al. ............ | 370/338 |
| 7,188,369 B2 * | 3/2007 | Ho et al. ................ | 726/24 |
| 7,207,062 B2 * | 4/2007 | Brustoloni .............. | 726/13 |
| 2004/0003284 A1 * | 1/2004 | Campbell et al. ......... | 713/201 |
| 2005/0005006 A1 * | 1/2005 | Chauffour et al. ........ | 709/223 |
| 2006/0056313 A1 * | 3/2006 | Rietschel ............... | 370/254 |

\* cited by examiner

*Primary Examiner*—Edan Orgad
*Assistant Examiner*—Jay P. Patel
(74) *Attorney, Agent, or Firm*—Okamoto & Benedicto LLP

(57) ABSTRACT

In one embodiment, a technique for configuring a network component in a computer network includes coupling the network component to a first computer and a second computer. The network component may be an appliance while the second computer may be a management server for the appliance, for example. A data unit, such as an Internet Protocol (IP) packet, can be sent from the first computer and the data unit can be observed by the appliance such that a source of the data unit may be determined. The source address of the data unit can then be adopted as an appliance address. Also, the appliance address may be forwarded from the appliance to the management server for registration. The appliance may be a transparent security appliance or device, for example. Among other advantages, the technique allows for plug-and-play accommodation of network components with good usability across different network configurations.

9 Claims, 5 Drawing Sheets

METHOD AND APPARATUS FOR CONFIGURING A NETWORK COMPONENT

BACKGROUND OF THE INVENTION

1. Field of the Invention

The present invention relates generally to computer systems, and more particularly but not exclusively to computer networks.

2. Description of the Background Art

As is well known, computers belonging to a computer network may send data to one another. Data may be encapsulated and forwarded to other computers in packets in accordance with a particular protocol. One commonly-used protocol in different network arrangements is the Internet Protocol (IP). A standard "IP" packet includes a header indicating the source and the destination addresses of the packet. Accordingly, each component (e.g., "device," "agent," or "appliance") on the network must have a designated IP address in order to be located for communication with other components.

An appliance is a stand-alone, special purpose network component. Unlike other network components, such as client and server computers, an appliance typically does not have its own display or external I/O peripherals. In the typical deployment of appliances to a network, an IP address would have to be "assigned" to each appliance. As an example, transparent security appliances, such as those used for virus detection and the like, may be coupled to the network by assigning each security appliance its own unique IP address. The IP address would typically be used by each appliance for communication of logs, reports, and/or configuration commands with a designated server employed to manage appliances in the network. However, assigning an IP address to an appliance involves connecting a console cable or a type of module to the appliance, which is generally not convenient. Further, in some network configurations, there may not be an IP address readily available for appliances. In either situation, the "plug-and-play" capability of appliances and similar devices is severely limited.

SUMMARY

In one embodiment, a technique for configuring a network component in a computer network includes coupling the network component to a first computer and a second computer. The network component may be an appliance while the second computer may be a management server for the appliance, for example. A data unit, such as an Internet Protocol (IP) packet, can be sent from the first computer and the data unit can be observed by the appliance such that a source of the data unit may be determined. The source address of the data unit can then be adopted as an appliance address. Also, the appliance address may be forwarded from the appliance to the management server for registration. The appliance may be a transparent security appliance or device, for example. Among other advantages, the technique allows for plug-and-play accommodation of network components with good usability across different network configurations.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Embodiments of the present invention are described herein using an Ethernet network, a private network, example network and sub-network arrangements, and Internet Protocol (IP) as examples. It should be understood, however, that the invention is not so limited and may be employed in conjunction with other computer networks and/or protocols. Similarly, although embodiments of the present invention are described using appliances as examples, the invention is equally suitable for use with other network components that cannot be readily assigned its own unique network address.

Being computer-related, it can be appreciated that the components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may then be executed by a processor. Components may be implemented separately in multiple modules or together in a single module.

Embodiments of the present invention allow for configuration of appliances in a computer network in general. For example, embodiments of the invention may be employed to configure transparent security devices in a network, such as Ethernet or any private network, for example. As another example, embodiments of the invention may be employed to adopt an IP address from a computer on the network instead of having to assign an IP address. As yet another example, embodiments of the invention may be employed in a remote configuration of the appliance. Further, configuration of the appliance is suitable for a wide variety of network arrangements. These examples will be more apparent in light of the description that follows.

Figure 1A:
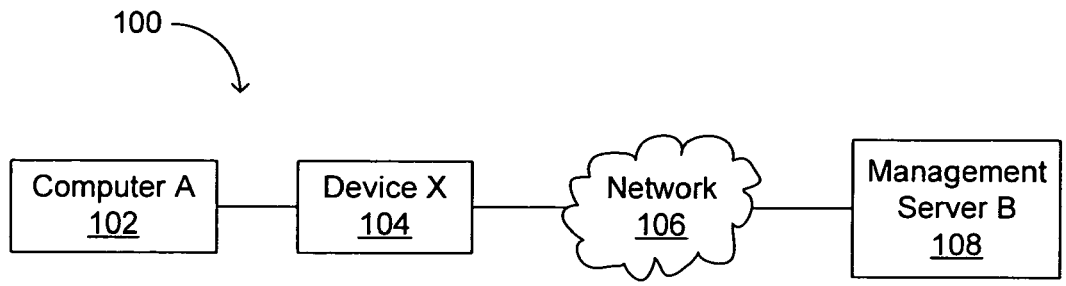
FIG. 1A schematically illustrates an appliance and server arrangement that may be used in embodiments of the invention.

Referring now to FIG. 1A, a schematic diagram of an appliance and server arrangement that may be used in embodiments of the invention is shown and indicated by the general reference character 100. The system of FIG. 1A, as well as other example systems and methods to follow, may have less or more components or steps so as to meet the needs of a particular application. As shown in the example of FIG. 1A, the arrangement may include Computer A 102, which can be any standard computing device, for example. Device X 104 can interface to Computer A 102 and also to Network 106. Management Server B 108 can also interface to Network 106. In one embodiment, Device X 104 and Management Server B 108 form a system for securing Network 106 against malicious content, such as computer viruses. Device X 104 can be a transparent security appliance, such as one containing a scanning engine or otherwise suitable operation for virus scanning, for example. Such a scanning engine or the like may be configured for scanning packets or data units for viruses. Management Server B 108 may be a server computer for managing one or more Devices X 104. Network 106 can be an Ethernet network or a private network, for example. It should be noted that each of Computer A 102, Device X 104, and Management Server B 108 can be included within Network 106, but are shown here in conceptualized fashion in order to highlight their relative arrangement. In the example of FIG. 1A, Computer A 102 is "behind" Device X 104 in that the only path from Computer A 102 to network 106 is through Device X 104.

Figure 1B:
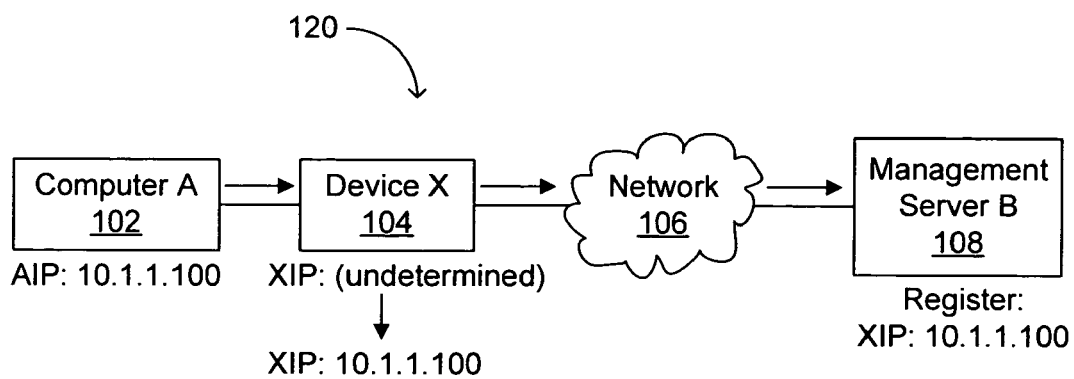
FIG. 1B schematically illustrates a registration sequence for an appliance and server arrangement in accordance with an embodiment of the invention.

Referring now to FIG. 1B, a schematic diagram of a registration sequence for an appliance and server arrangement in accordance with an embodiment of the invention is shown and indicated by the general reference character 120. In this example, Computer A 102 has an IP address ("AIP") of "10.1.1.100," but appliance Device X 104 initially has an undetermined IP address. Because Device X 104 is to be configured for "plug-and-play" adaptation across a wide variety of possible network arrangements, it initially does not contain an IP address. When Computer A 102 sends out a data unit, such as a packet (e.g., an IP packet), Device X 104 can observe the data unit or packet from its relative position. Essentially, the packet may pass through Device X 104, allowing Device X 104 to determine and adopt the IP address of Computer A 102 (AIP). As shown in FIG. 1B, the IP address of Device X 104, which is labeled as "XIP", can then be changed from an undetermined state to "10.1.1.100," the IP address of Computer A 102 (AIP). In this fashion, Device X 104 can "adopt" the IP address of a computer situated "behind" it in a network arrangement. Once Device X 104 has adopted the IP address of Computer A 102, the address of Device X 104 can be registered as XIP=10.1.1.100, for example, in Management Server B 108, as shown.

In this fashion, Device X 104 can obtain or adopt an IP address from another device without actual "assignation" of the address (e.g., by having to use a console cable or the like). Further, this IP address can then be provided to Management Server B 108 so that the server can be enabled to communicate with Device X 104. Device X 104 can then send logs, reports, and/or other responses to Management Server B 108 in response to its commands and/or requests made in data unit or packet form.

Figure 1C:
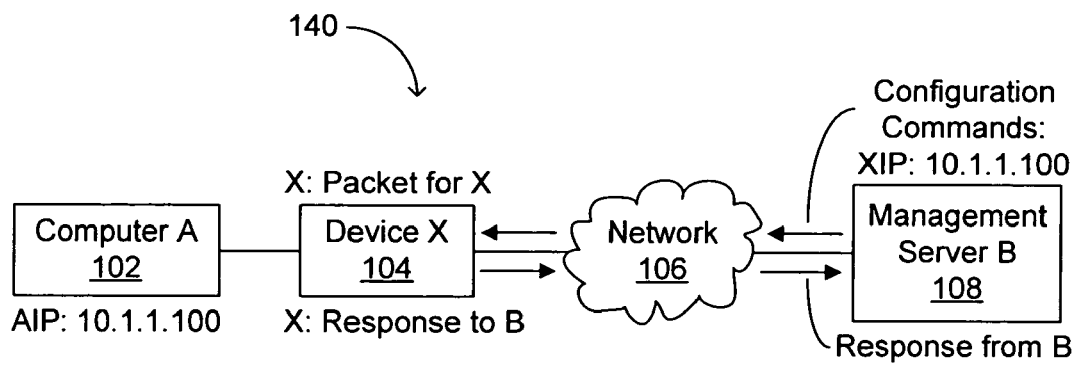
FIG. 1C schematically illustrates a remote configuration sequence for an appliance and server arrangement in accordance with an embodiment of the invention.

Referring now to FIG. 1C, a schematic diagram of a remote configuration sequence for an appliance and server arrangement in accordance with an embodiment of the invention is shown and indicated by the general reference character 140. Management Server B 108 can send a packet, such as one that may contain configuration commands, to Device X 104. The packet can designate IP address "10.1.1.100" as its destination address, for example. However, while Device X 104 may have borrowed the IP address of Computer A 102, both may have the same IP address because "AIP" has not changed. In the example shown in FIG. 1C, the packet from Management Server B 108 is intended for Device X 104 and not for Computer A 102. As will be discussed in more detail below with reference to FIGS. 2A and 2B, either a specific pattern in the packet, a port number designation, or other target identification technique may be used to determine the appropriate designation of the packet. In FIG. 1C, Device X 104 can examine the packet, determine the packet is intended for it, and then provide an appropriate response back to Management Server B 108 without allowing the packet to flow through to Computer A 102.

Figure 1D:
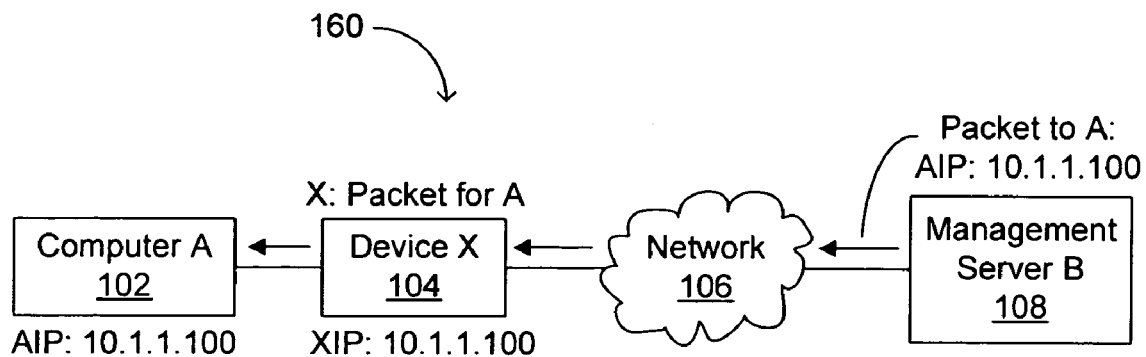
FIG. 1D schematically illustrates a passing of traffic through an appliance configured in accordance with an embodiment of the invention.

Referring now to FIG. 1D, a schematic diagram of a passing of traffic through an appliance configured in accordance with an embodiment of the invention is shown and indicated by the general reference character 160. As discussed above with reference to FIG. 1C, both Computer A 102 and Device X 104 may have the same IP address. In the example of FIG. 1D, a packet received from Management Server B 108 or another component on Network 106 may be intended for Computer A 102 and not for Device X 104. In this example, Device X 104 can determine that the packet is not intended for it and then the packet can accordingly be passed along to its intended target, Computer A 102. Again, techniques for determining whether a packet is intended for Device X 104 or a network component situated behind Device X 104 are further discussed below. One or more of such techniques for determining the target of a packet may be programmable and designated in a table or listing within Management Server B 108, for example.

Figure 2A:
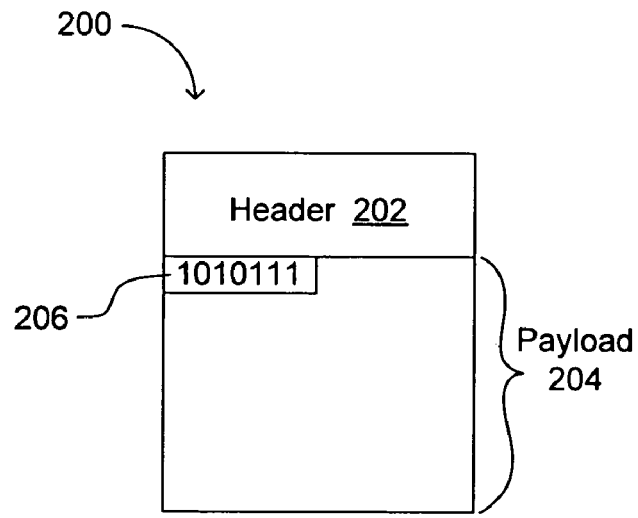
FIG. 2A illustrates a specific pattern example for target determination in accordance with an embodiment of the invention.

Referring now to FIG. 2A, an illustration of a specific pattern example for target determination in accordance with an embodiment of the invention is shown and indicated by the general reference character 200. The data unit or packet of FIG. 2A may include Header 202 and Payload 204. Other fields and/or portions may also be included for a particular type of data unit or packet. In the particular example shown in FIG. 2A, a specific pattern 206 of "1010111" may indicate a packet is designated for Device X 104. Accordingly, if any other combination of bits is found in the position of pattern 206, Device X 104 may determine that the packet is not intended for it so that the packet can be passed along to the next network connection (e.g., Computer A 102). Of course, the specific pattern shown is only one example and more or less bits, other combinations of bits, and/or another location of the specific pattern within the stream are other possible implementations within the scope of embodiments of the invention.

Figure 2B:
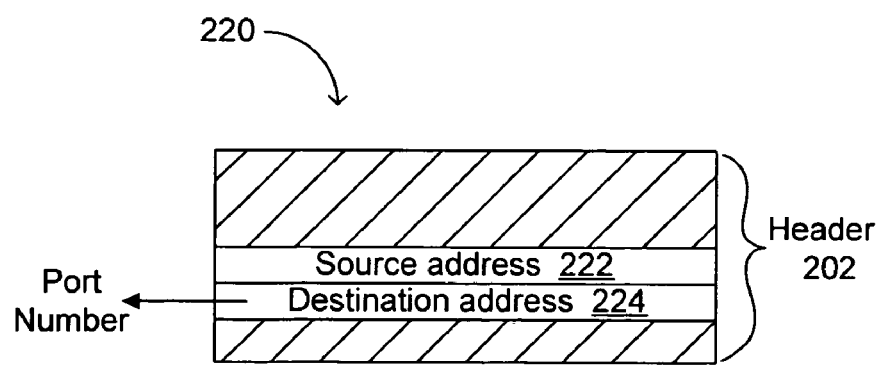
FIG. 2B illustrates a port number example for target determination in accordance with an embodiment of the invention.

Referring now to FIG. 2B, an illustration of a port number example for target determination in accordance with an embodiment of the invention is shown and indicated by the general reference character 220. Header 202 can be the same or similar to the header as shown in packet 200 of FIG. 2A. In the example of FIG. 2B, Header 202 can include Source address 222 and Destination address 224. Such fields are common to IP addresses, for example. In this example, a port number can be extracted from the destination address. Accordingly, Device X 104 may use a port number to determine if a packet is intended for it or if the packet should be passed along to another device on the network. Of course, this is only one example and such a port number may be found or extracted from another portion of a packet or data unit according to aspects of embodiments of the invention.

Other techniques for determining the target of a data unit may also be employed without detracting from the merits of the present invention.

According to embodiments of the invention, an appliance, such as a transparent security device, may be used in "plug-and-play" fashion in any of a wide variety of suitable network configurations. The appliance can adopt or borrow one of a number of possible IP addresses, depending on the particular arrangement of the network, which may be a private network, for example. Next, some example network arrangements will be discussed in order to show possible appliance configurations consistent with embodiments of the invention.

Figure 3:
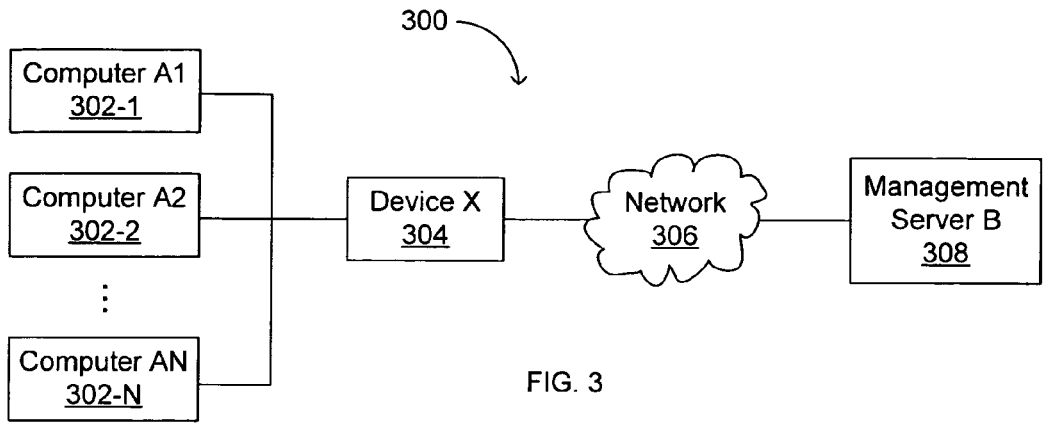
FIG. 3 schematically illustrates a multiple computer, single appliance example arrangement that may be used in embodiments of the invention.

Referring now to FIG. 3, a schematic diagram of a multiple computer, single appliance example arrangement that may be used in embodiments of the invention is shown and indicated by the general reference character 300. In FIG. 3, a group of computers (e.g., Computer A1 302-1, Computer A2 302-2, and so on through Computer AN 302-N) can be connected in a parallel interface type arrangement. Device X 304, which can be a network component, such as a transparent security appliance, the same or similar to Device X 104 of FIGS. 1A-1D, can interface to the parallel computer arrangement as well as to Network 306. Also, Management Server B 308 can interface to Network 306. As in the examples discussed above with reference to FIGS. 1A-1D, FIG. 3 represents a conceptualized relative arrangement of interest and, in fact, all components may be considered a part of the "network."

In the example of FIG. 3, Device X 304 may register with its associated Management Server B 308 in a similar fashion as discussed above with reference to FIG. 1B. In one embodiment, because there are several computers arranged "behind" Device X 304, the IP address of any one of Computer A1 302-1, A2 302-2, . . . A2 302-N may be adopted or borrowed by Device X 304. Upon the initial placement of Device X 304 in the network, an IP address indicated in a packet passing through Device X 304 may be detected by Device X 304 and adopted as the IP address of Device X 304, in accordance with embodiments of the invention. Further, once Device X 304 has adopted an IP address, this address can then be registered with Management Server B 308 in a similar fashion as discussed above with reference to FIG. 1B. Thereafter, a packet coming from Network 306 and along the path of Device X 304 can be identified as either for Device X 304 or a computer situated behind Device X 304. If the packet is for Device X 304, Device X 304 can keep and/or process the packet. If the packet is for a computer behind Device X 304, Device X 304 can forward the packet along to the computer intended to receive the packet. In one embodiment, Device X 304 may scan the packet for viruses or other malicious content before forwarding the packet to its intended destination. Further, as discussed above, Device X 304 may look for a specific pattern, port number, or other indicator to determine the intended destination of the packet.

Figure 4:
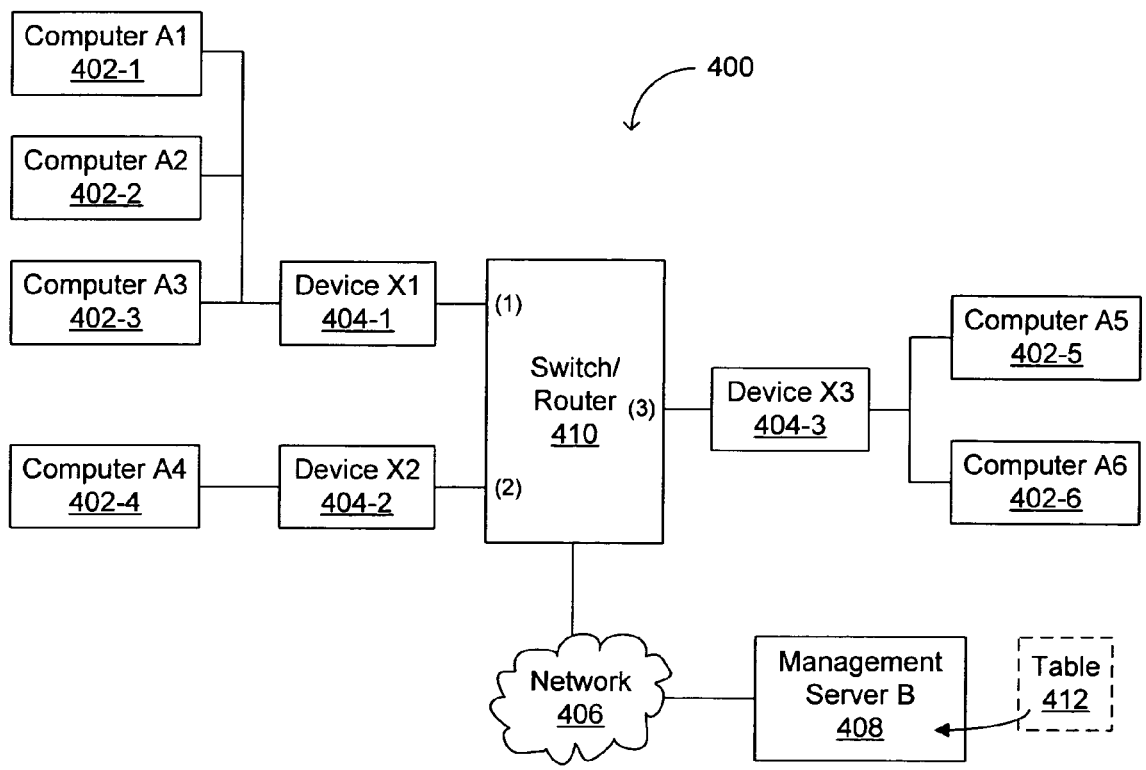
FIG. 4 schematically illustrates a multiple computer, multiple appliance example arrangement that may be used in embodiments of the invention.

Referring now to FIG. 4, a schematic diagram of a multiple computer, multiple appliance example arrangement that may be used in embodiments of the invention is shown and indicated by the general reference character 400. In FIG. 4A, a group of three computers, Computer A1 402-1, Computer A2 402-2, and Computer A3 402-3, may be arranged in parallel. Device X1 404-1 can interface to computers A1 (402-1), A2 (402-2), and A3 (402-3) and also to Switch/Router 410. The numbers in parenthesis within box 410 can indicate sub-network and/or port numbers. Device X2 404-2 can interface to Computer A4 402-4 as well as to Switch/Router 410. Also, Computer A5 402-5 and Computer A6 402-6 can be arranged in parallel. Device X3 404-3 can interface to computers A5 (402-5) and A6 (402-6) as well as to Switch/Router 410. As shown, Switch/Router 410 and Management Server B 408 may be coupled to Network 406. All of the components shown may be considered as part of Network 406, but Network 406 is shown as separated out in order to highlight the particular arrangements of interest.

In FIG. 4, one or more of Devices X1 (401-1), X2 (404-2), and X3 (404-3) may be appliances, such as those for detecting viruses and the like. Management Server B 408 may be for managing the appliances in the network. Each appliance may "borrow" an IP address from a computer behind it. For example, Device X1 404-1 may borrow an IP address from either Computer A1 402-1, Computer A2 402-2, or Computer A3 402-3. In one embodiment, the first of computers A1 (402-1), A2 (402-2), or A3 (402-3) to send out a packet once Device X1 404-1 is placed in the network arrangement as shown, can be used to provide an IP address for Device X1 to adopt. For example, if Computer A2 402-2 sends out a packet prior to A1 (402-1) or A3 (402-3), Device X1 404-1 can adopt the IP address of Computer A2 402-2. This IP address can then be registered with Management Server B 408, as discussed above.

In the example arrangement of FIG. 4, Device X2 404-2 can borrow the IP address of Computer A4 402-4 in similar fashion as discussed above with reference to FIG. 1B. Because of the arrangement, only one computer is located "behind" Device X2 404-2, so Device X2 404-2 may not be able to observe packets from other computers passing through the transparent device. Device X3 404-3, on the other hand, can adopt an IP address from either Computer A5 402-5 or Computer A6 402-6. As discussed above with reference to Device X1 404-1, the first of the parallel arranged computers to send a packet for Device X3 404-3 to observe may also provide an IP address for Device X3 404-3 to borrow. Accordingly, if Computer A6 402-6 sends a packet prior to Computer A5 402-5 once Device X3 404-3 is placed in the network arrangement, Device X3 404-3 can adopt the IP address of Computer A6 402-6 and subsequently register that IP address as its own with Management Server B 408.

Also in the example arrangement of FIG. 4, in order for Management Server B 408 to effectively track all of the appliances it is to manage within the particular network arrangement, a table (e.g., Table 412) or a listing may be used. For example, such a table may include the sub-network locations of each appliance. In one embodiment, the table may also include other information, such as the registered IP address, the specific pattern used for designating packets for the appliance, and the like. The table below provides an example implementation for the arrangement of FIG. 4.

| Appliance | Sub-network location | IP address | Pattern for matching | Port number matching |
|---|---|---|---|---|
| Device X1 | (1) | 10.1.1.101 | 1010111 | 0 |
| Device X2 | (2) | 10.1.1.110 | 1110111 | 0 |
| Device X3 | (3) | 10.1.1.111 | 1111011 | 0 |

In the table, Device X1 404-1 is on sub-network (1), as also indicated in FIG. 4. Similarly, Device X2 404-2 is on sub-network (2) and Device X3 404-3 is on sub-network (3) in this example. Accordingly, if Management Server B 408 wants to send a request to a specific appliance, it can direct via its packet header information so that Switch/Router 410 knows on which port to send the packet out. Also listed in the example table above are IP addresses for each appliance or transparent security device, for example. As discussed above, the IP address for Device X1 404-1 (e.g., 10.1.1.101) may be adopted from any one of Computer A1 (402-1), A2 (402-2), or A3 (402-3) in the example network arrangement of FIG. 4. Similarly, the IP address for Device X3 404-3 (e.g., 10.1.1.111) may be adopted from either Computer A5 402-5 or Computer A6 402-6 in the example network arrangement of FIG. 4. Because sub-network (2) only contains one computer (Computer A4 402-4) in the example network arrangement of FIG. 4, the IP address for Device X2 404-2 (e.g., 10.1.1.110) can be adopted only from Computer A4 402-4.

Also included in the example table above are specific patterns which may be used to match with a pattern stored in each appliance so as to identify whether a packet observed is intended for the appliance or for another device, as discussed above with reference to FIG. 2A. As an alternate embodiment aspect, a same specific pattern can be used for each of the appliances in a network if the management server wishes to communicate the same message or command to each of the appliances. Alternatively, the same message or command can simply be repeated to each appliance by using the unique specific pattern structure as exemplified in the table above. The port number matching indication in the last column in the example table above may indicate whether port number matching or specific pattern matching is to be used. In this example, each is set to "0" to indicate that port number matching is not to be used. Accordingly, the specific pattern matching can be used to identify whether a packet is for a given appliance or for another component on the network or sub-network, for example.

Figure 5:
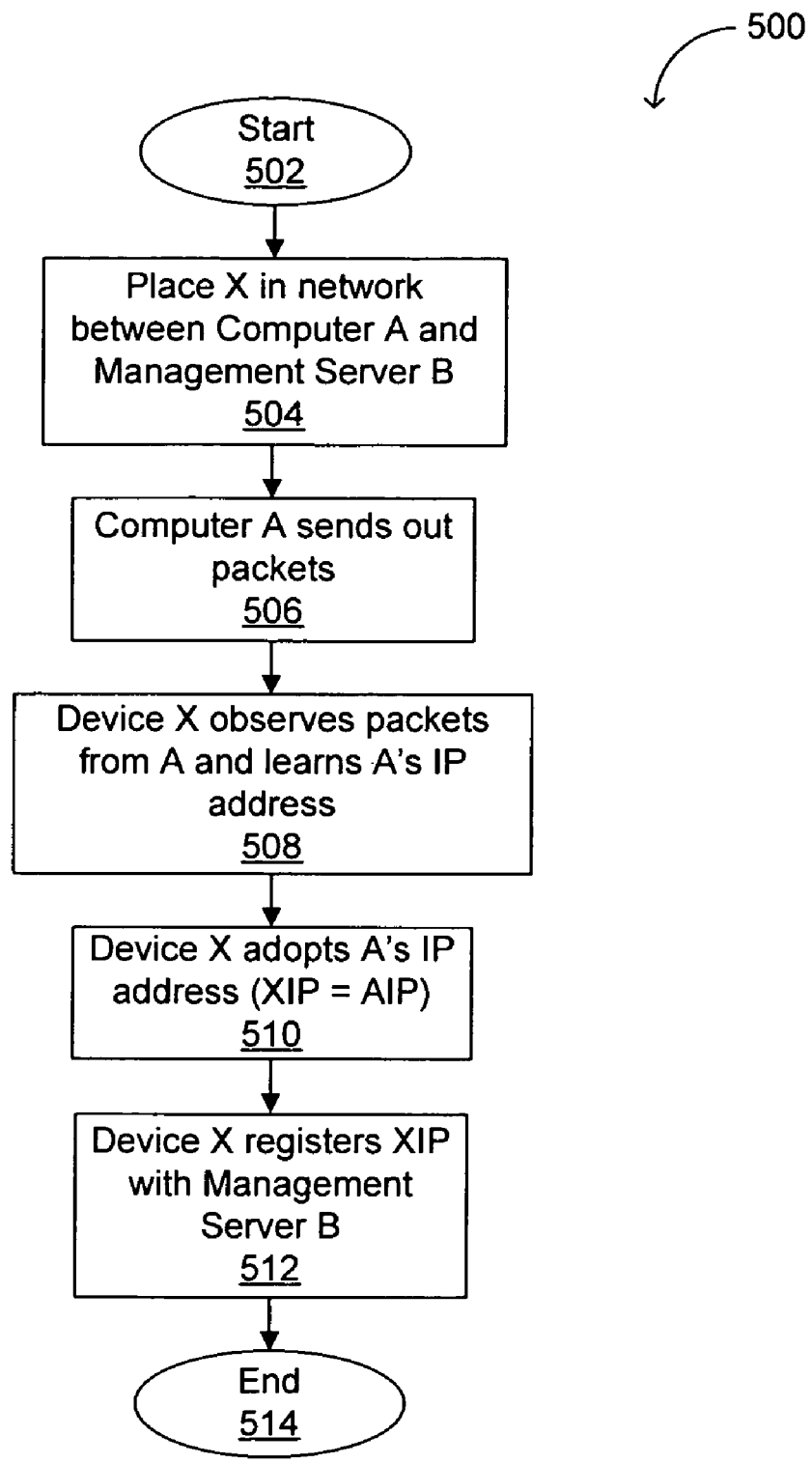
FIG. 5 shows a flow diagram of a registration sequence for an appliance and server arrangement in accordance with an embodiment of the invention.

Referring now to FIG. 5, a flow diagram of a registration sequence for an appliance and server arrangement in accordance with an embodiment of the invention is shown and indicated by the general reference character 500. This diagram can be viewed in conjunction with FIG. 1B discussed above. In FIG. 5, the flow can begin in Start 502. The appliance (e.g., Device X 104) can be placed in a network between Computer A 102 and Management Server B 108 (step 504). Computer A 102 can then send out one or more packets or data units (step 506). Device X 104 can then observe the packets from Computer A 102 and learn the IP address of Computer A 102 (step 508). Device X 104 can then borrow or adopt A's IP address as Device X 104's IP address ("XIP=AIP")(step 510). Device X 104 can then register XIP with Management Server B 108 (step 512). The flow can complete in End 514.

Figure 6:
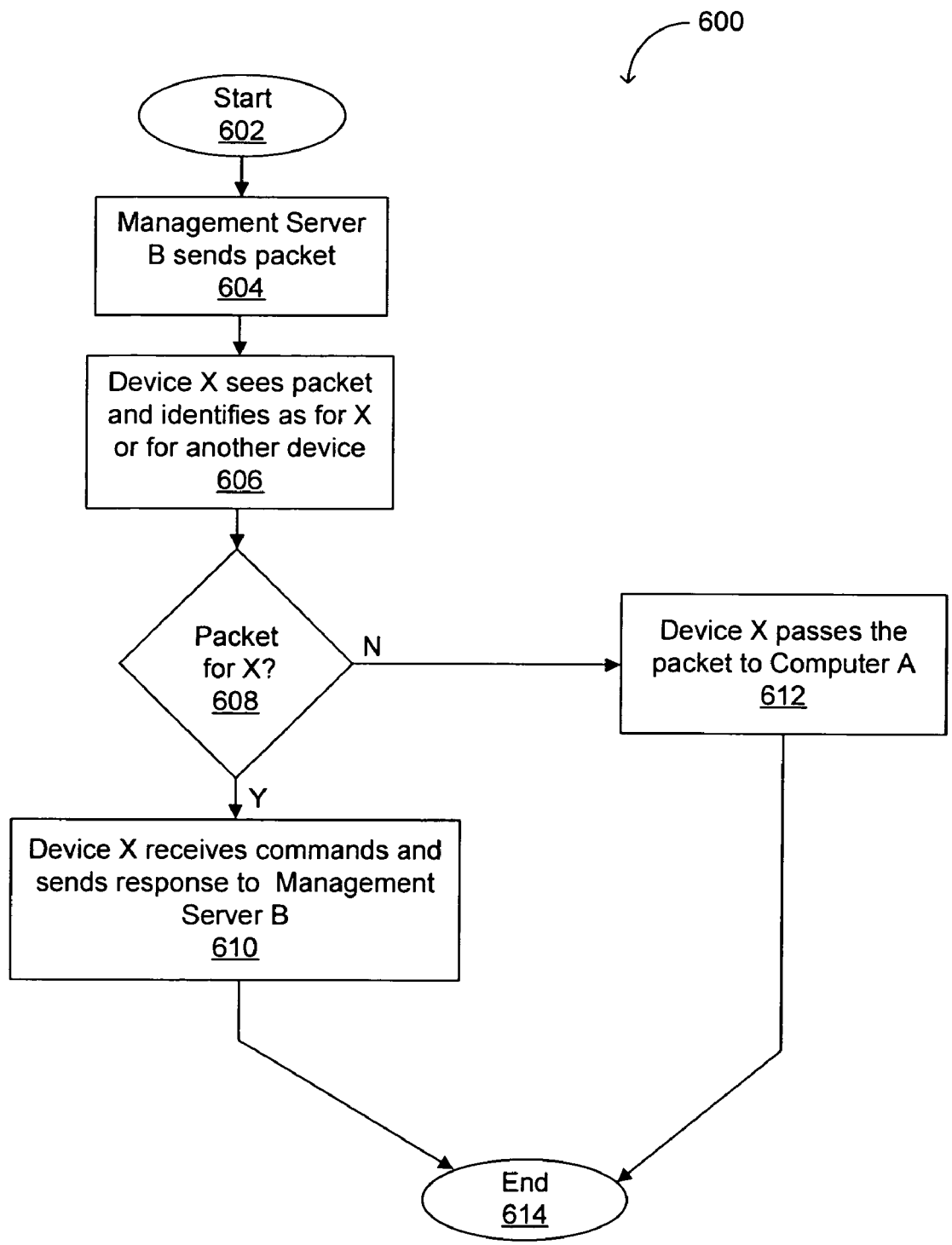
FIG. 6 shows a flow diagram for a remote configuration sequence for an appliance and server arrangement in accordance with an embodiment of the invention.

Referring now to FIG. 6, a flow diagram for a remote configuration sequence for an appliance and server arrangement in accordance with an embodiment of the invention is shown and indicated by the general reference character 600. This diagram can be viewed in conjunction with FIGS. 1C and 1D discussed above. In FIG. 6, the flow can begin in Start 602. Management Server B 108 can then send one or more packets or data units (step 604). Device X 104 can then observe the packet and identify the packet as either for Device X 104 or for some other device on the network, such as Computer A 102 (step 606). As discussed above with reference to FIGS. 2A and 2B in particular, such identification may be done by matching a specific pattern in the payload of a packet or matching a port number from the packet, for example. In FIG. 6, if the packet is found to be intended for Device X 104 (decision box 608), Device X 104 can receive the packet, including the associated commands, for example, and send a response back to Management Server B 108 (step 610). However, if the packet is found to not be intended for Device X 104 (decision box 608), Device X 104 can pass the packet along the network path (e.g., to Computer A 102)(step 612). The flow can complete in End 614.

In light of the present disclosure, it can be appreciated that the present invention may be generally employed to facilitate "plug-and-play" capability across a wide variety of network arrangements for an appliance. For example, embodiments of the present invention may be used to facilitate the placement of transparent security appliances or devices into computer networks. For example, embodiments of the present invention advantageously allow networks to be easily protected by security appliances configured to scan for viruses.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of remote configuring a network component in a computer network, the method comprising:
    coupling a network component to a first computer and a second computer in a computer network, the network component being configured to adopt an address of the first computer as an address of the network component in the computer network;
    sending a data unit from the second computer;
    receiving the data unit in the network component;
    identifying an intended destination of the data unit; and
    if the network component is the intended destination of the data unit, processing the data unit in the network component without forwarding the data unit to the first computer;
    wherein identifying the intended destination of the data unit includes matching a specific pattern in a payload of the IP packet.

2. The method of claim 1 wherein the data unit comprises an Internet Protocol (IP) packet.

3. The method of claim 1 wherein the second computer comprises a management server.

4. The method of claim 1 wherein the network component comprises a transparent security appliance.

5. The method of claim 4 wherein the transparent security appliance comprises a scanning engine for scanning packets for malicious content.

6. The method of claim 1 wherein identifying the intended destination of the data unit includes matching a specific pattern in the data unit.

7. The method of claim 1 wherein the identifying the intended destination of the data unit includes matching a port number in the data unit.

8. The method of claim 2 wherein the identifying the intended destination of the data unit includes matching a port number in a destination address field of the IP packet.

9. The method of claim 1 further comprising:
    forwarding the data unit to the first computer if the first computer is the intended destination of the data unit.

* * * * *